United States Patent [19]

Plunkett, Jr.

[11] 4,332,021
[45] May 25, 1982

[54] DICTATION SYSTEM INCLUDING DICTATE STATION IDENTIFIER AND CONTROL OF ACCESS TO PARTICULAR RECORDERS

[75] Inventor: Luther C. Plunkett, Jr., Atlanta, Ga.

[73] Assignee: Lanier Business Products, Inc., Atlanta, Ga.

[21] Appl. No.: 196,400

[22] Filed: Oct. 14, 1980

Related U.S. Application Data

[62] Division of Ser. No. 352, Jan. 2, 1979, Pat. No. 4,254,307.

[51] Int. Cl.³ .............................................. G11B 19/02
[52] U.S. Cl. .................................... 369/29; 179/6.09; 369/26
[58] Field of Search ............................ 369/26, 28, 29; 179/6.09, 6.07, 6.11, 6.17, 2 R, 2 A; 340/171 R, 171 PF, 171 A

[56] References Cited

U.S. PATENT DOCUMENTS

| | | |
|---|---|---|
| 2,783,304 | 2/1957 | Crabtree . |
| 3,286,033 | 11/1966 | Lemelson . |
| 3,301,958 | 1/1967 | Blakeslee et al. . |
| 3,648,249 | 3/1972 | Goldsberry . |
| 3,725,589 | 4/1973 | Golden . |
| 3,984,644 | 10/1976 | Matz ...................................... 369/29 |
| 4,004,276 | 1/1977 | Robinson et al. . |
| 4,065,755 | 12/1977 | Oliveira . |
| 4,075,436 | 2/1978 | Bolick, Jr. ............................. 369/29 |
| 4,114,142 | 9/1978 | Wycoff et al. ................. 340/171 PF |

OTHER PUBLICATIONS

EP 0,013,024 A1, Plunkett, Jr., Dictate Station Identifier, Abstract and European Search Report, 7/80.

Primary Examiner—Raymond F. Cardillo, Jr.
Attorney, Agent, or Firm—Jones & Askew

[57] ABSTRACT

A dictation system including means for manually or automatically providing a sequence of identifier signals, a decoder for decoding the identifier signals, and inhibiting means for rendering a dictation recorder inoperable in the absence of a predetermined sequence of identification signals. Control lines carry identifier signals which are electrically identical to control signals used to control the dictation recording functions of the dictation recorder. Identification signals may be generated automatically, by a keyboard, or by the dictate station normal function control switches. A decoder decodes the identification signals appearing on the control lines. Inhibiting means prevent the dictation recorder from recording dictation until receipt of a predetermined sequence of identification signals.

3 Claims, 6 Drawing Figures

DICTATION SYSTEM INCLUDING DICTATE STATION IDENTIFIER AND CONTROL OF ACCESS TO PARTICULAR RECORDERS

This application is a division of application Ser. No. 000,352, filed Jan. 2, 1979, now U.S. Pat. No. 4,254,307.

TECHNICAL FIELD

The present invention relates to remote dictation systems and more particularly to apparatus for providing a signal to a remote recorder or controller identifying a particular dictate station or dictator.

BACKGROUND OF THE INVENTION

In central dictation systems it is often desired to provide a means of identifying which dictate station from a plurality of dictate stations has seized a particular recorder or to identify the dictator who has seized a recorder or recorded a particular segment of dictation.

It is also desirable in some situations to provide a station identifier which is selectively operable either to automatically identify the station when taken off-hook or to provide a sequence of identifier signals in response to a manual operation such as depressing a sequence of keys on a keyboard. For instance, in many office situations a dictate station will be located at a particular person's desk and it is normally desirable to have an identifier signal transmitted to the recorder or some other central memory device when the dictate station is taken off-hook. In this situation it is also desirable to have a means of manually generating an identifier signal in lieu of the automatic identification, such as when another dictator is using the office of the person identified by the automatic sequence.

In other office situations a particular central recorder will be connected to a plurality of dictate stations at various locations. Where such a recorder is dedicated to some kind of priority work, it is desirable to make the recorder responsive only if the dictation is preceded by an identifier signal indicating that an authorized person has seized the recorder. Such a situation might be where three dictate stations which are accessible to a large number of persons are linked to a particular priority recorder but it is desired to prevent unauthorized individuals from placing dictation on this recorder. In this instance, it is desirable to have a means for making a dictation recorder unresponsive to attempts to dictate thereon unless a particular manually entered identifier sequence precedes the dictation.

In a similar environment it may be desirable to automatically provide a sequence of identifier signals identifying the particular dictate station and to subsequently require manual provision of additional identifier signals identifying the dictator. In this and the other environments considered above, it is desirable from the standpoint of minimum expense that the same means be used at a dictate station to provide both identifier signals and control signals for controlling the recording functions of the recorders. In spite of the foregoing and other requirements for identifier signals in remote dictation systems, the prior art has simply provided apparatus to generate a series of electrical signals identifying a particular dictate station which are recorded in parallel with a segment of dictation at a recorder in the system or apparatus connected with a central switching system which is responsive to the state of multiple switches and can identify a state in which a particular dictate station has seized a particular recorder.

Thus, the prior art has not provided an identifying apparatus for use in a central dictation system which generates identifier signals at the dictate station, either manually or automatically, and transmits the signals to a recorder prior to the recorder being rendered responsive to control signals from the dictate station which are generated by the same means as the identifier signals. Furthermore the prior art has not provided an identification system which includes an automatic identifier at a location remote from the dictate station which may be selectively overridden by a manually operated identifier.

SUMMARY OF THE INVENTION

It is an object of the present invention to provide apparatus which automatically generates a sequence of signals identifying a dictate station that may be provided directly to a recorder and also to a central memory unit.

It is a further object of this invention to provide apparatus which is selectively operable to either automatically generate a sequence of identifying signals or to generate a sequence of identifying signals in response to manual keyboard entries.

It is still a further object of this invention to provide apparatus for generating a sequence of identifier signals which are the electric equivalent of control signals from the dictate station controlling recorder functions and to further provide apparatus associated with a recorder which distinguishes between a given signal provided as an identifier signal and the same signal provided as a control signal.

It is a further object of this invention to provide apparatus which will render a dictation recorder unresponsive to normal control signals upon seizure by a dictate station and subsequently render the recorder responsive to control signals after receipt of a particular signal or a particular number of signals.

It is yet a further object of this invention to provide apparatus for testing a received identifier signal at a dictation recorder and inhibiting use of the recorder if the identifier signal does not correspond to a predetermined valid identifier signal.

These and other objects of this invention are provided by a signal generating apparatus connected to the control lines of a dictate station in a central dictation unit. The connections from the signal generating apparatus are either diode isolated or provided with tri-state outputs so that the control lines from the dictate station may be treated as a bus to a particular recorder. The identifier becomes operative a predetermined amount of time after the dictate station is taken off-hook. A switching apparatus is provided which prevents operation of the recorder until operation of the dictate station identifier is completed and therefore prevents the recorder from responding to the identifier signals as recorder control signals.

The automatic identification is provided by selectively connecting the outputs of a sequential counter to the inputs of the drive stages associated with the control lines of a dictate station in order to generate signals corresponding to a predetermined sequence of digits. The identifier may be made responsive to manual entry from a keyboard associated with the dictate station or from the same controls which the dictator normally uses to operate the recorder so that manually entered digits are encoded as signals on the dictate station control lines.

It is within the scope of the present invention to include a verifier for controlling access to a recorder. The verifier of the present invention responds to decoded identifier signals. Each decoded signal is tested against a corresponding signal from a memory location which defines a valid identifier signal. If any number fails to correspond to a valid identifier signal, a condition is provided which indicates that an invalid identifier sequence has been provided. This condition will inhibit the transport of the recorder from responding to function control signals and thus inhibit its use by an unauthorized dictator.

DESCRIPTION OF THE PREFERRED EMBODIMENT

Figure 4:
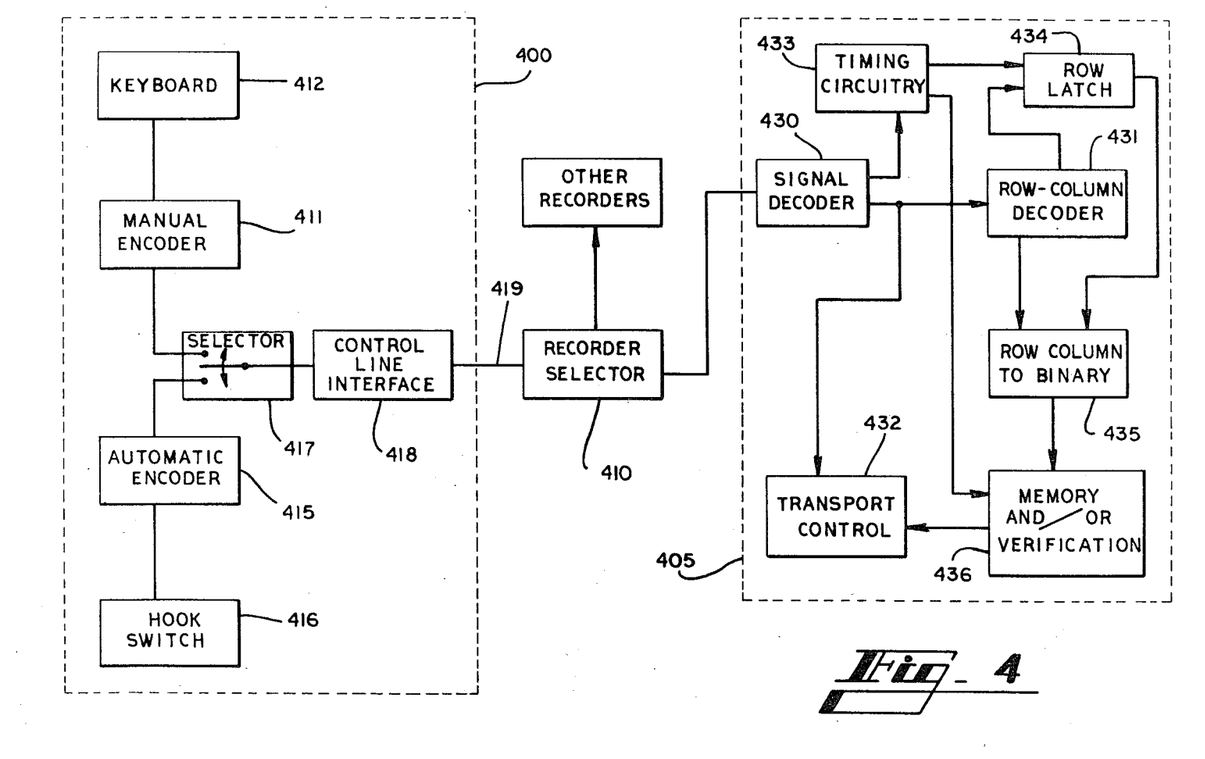
FIG. 4 is a block diagram of the preferred embodiment of the present invention.

FIG. 4 is a block diagram of the present invention and shows the basic components thereof. The present invention is used in an environment which includes a dictate station 400, a dictation recorder 405 which may be connected to the dictate station through recorder selector 410. Recorder selector 410 may be manual switches, automatic central dictation system switching equipment, a hard wired connection, or any other means of connecting dictate station 400 to recorder 405. The station identifier of the present invention includes a manual signal encoder 411 which is responsive to signals from a keyboard 412. The identifier also includes an automatic encoder 415 which automatically generates a sequence of identifier signals in response to dictation station 400 going off-hook as represented by hook switch 416. A selector 417 is provided so that the operator of dictate station 400 may select either the automatic or the manual encoder prior to operating hook switch 416. The signals generated by either the manual encoder 411 or automatic encoder 415 are provided to control line interface 418 which encodes these signals into a plurality of voltages provided along at least one control line 419 to recorder 405. The decoder apparatus of the present invention includes a signal decoder 430 which decodes the various voltages provided by control line interface 418 into a binary number. The output of signal decoder 430 is provided to row-column decoder 431 and also to a transport control 432.

In the present invention, the transport control 432 will not operate until it receives a signal indicating that the identifier sequence is terminated but it is important to note that the output of signal decoder 430 provides both transport control signals and input to the remaining portion of the identifier decoder. Timing circuitry 433 is provided which controls the operation of the remaining portion of the identifier decoder.

As will be explained in further detail below, the identifier signals used in the preferred embodiment of the present invention are provided in a sequence in which a row signal is provided first, a column signal second, a row signal third, and so forth. Row latch 434 accepts and holds a row signal from decoder 431, and when both a row and a column signal are available, row/column to binary decoder 435 provides a binary output. This binary output is provided to block 436 which represents memory and/or verification circuitry. The digital output of row/column to binary converter 435 may be recorded directly on the recording tape, provided to a central memory location in a large central control system such as that shown in co-pending application Ser. No. 782,947, filed Mar. 30, 1977, now abandoned, a continuation of Ser. No. 023,951, which is now issued as U.S. Pat. No. 4,221,938, entitled "Central Control System" which is assigned to the same assignee of the present invention. The output of row/column to binary converter 436 may also be compared to a predetermined set of valid identifier signals which indicate that the user of dictate station 400 is authorized to record on recorder 405. Memory and/or verification circuitry 436 provides and output to transport control 432 which renders recorder 405 either responsive or unresponsive to signals received from signal decoder 430. Thus it may be seen that the present invention uses the same signals on the control lines thereto to serve as identifier signals and also to serve as function control signals for operating transport control 432. Detailed schematics of the preferred embodiment are provided in FIGS. 1A, through 3 and are explained below.

Figure 1A:
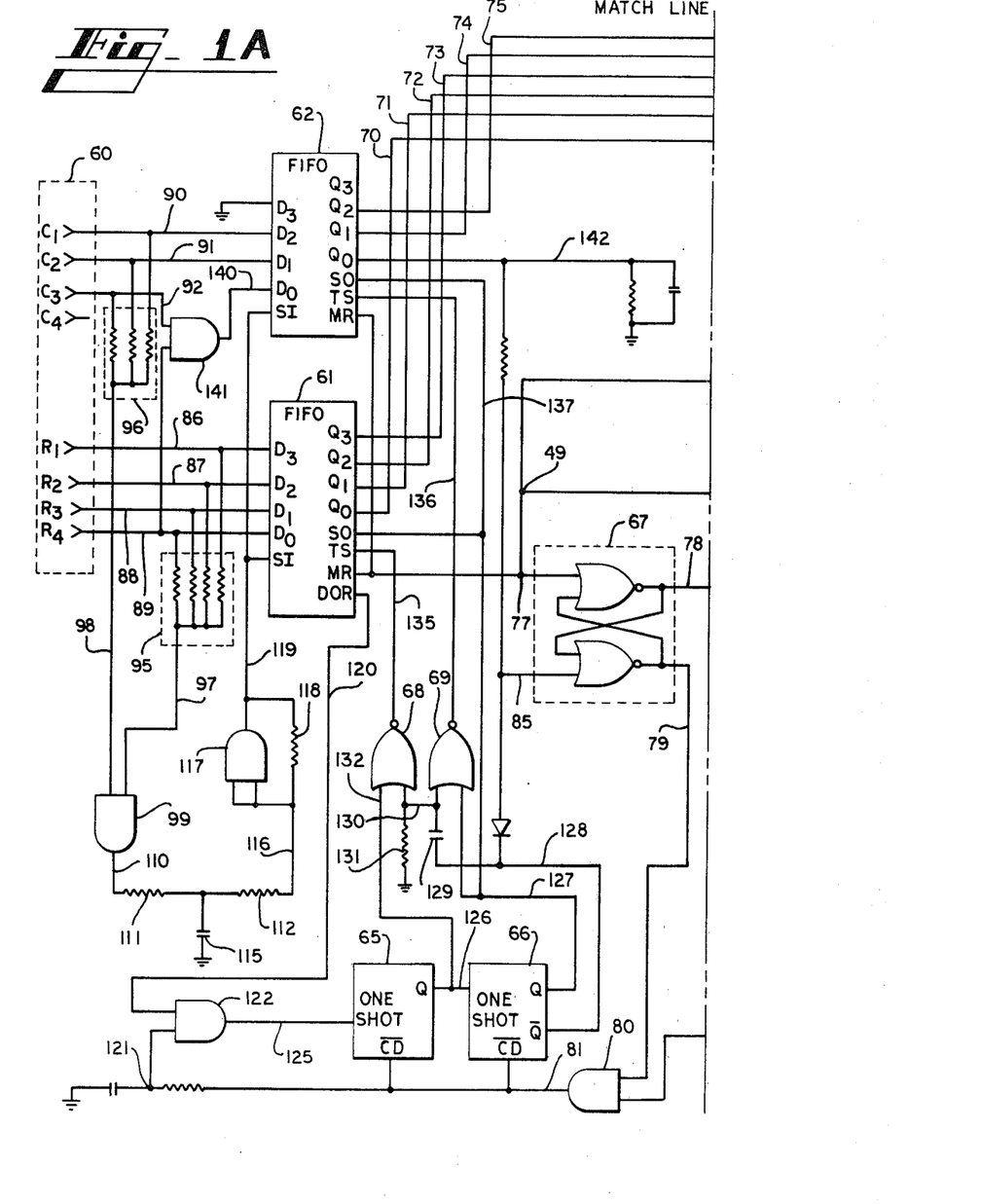
FIGS. 1A and 1B are a schematic diagram of a preferred embodiment of the identification signal generating apparatus of the present invention, FIGS. 1A and 1B being joined along a match line.
Figure 1B:
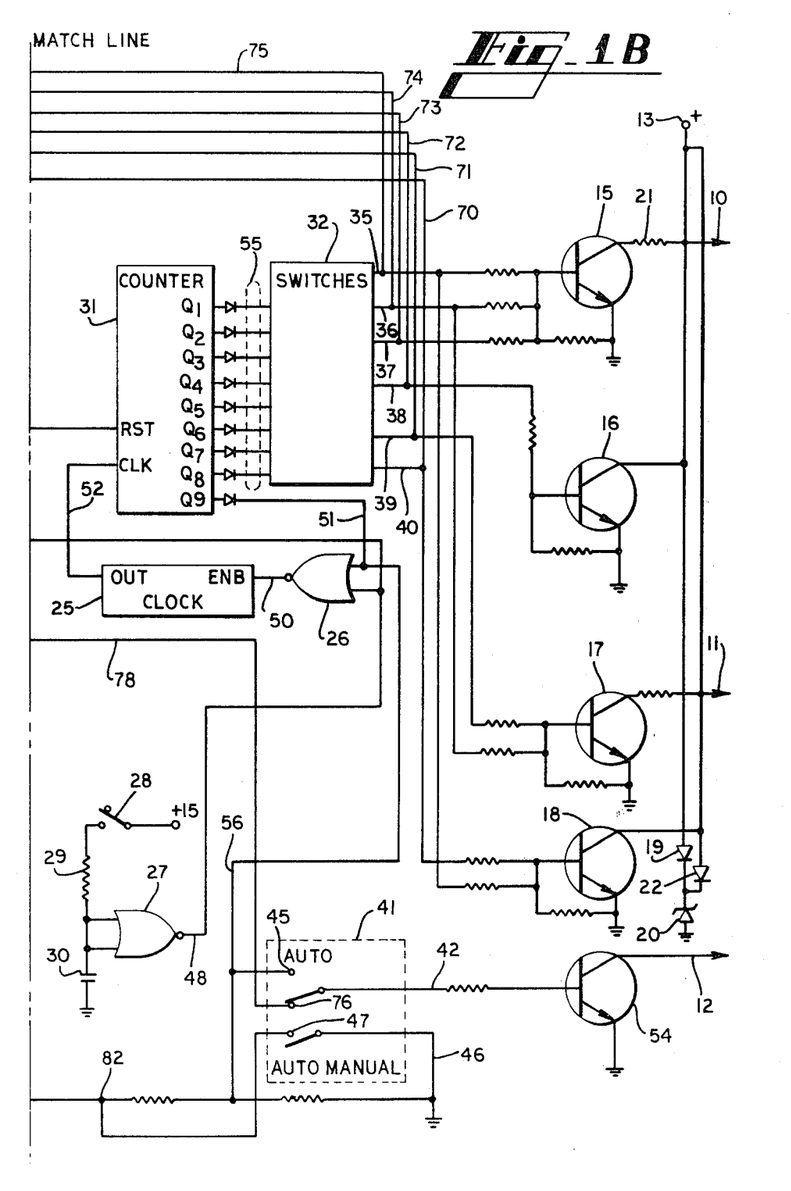

To understand the operation of the preferred embodiment of the present invention it is necessary to understand the environment in which it operates. Control lines 10 and 11 shown in FIG. 1B are control lines from the dictate station which control the operation of various functions of a recorder to which the dictate station is connected, such as dictate, rewind, listen, fast forward and so forth. Control lines 10 and 11 provide control signals to the recorder by having various DC voltage levels thereon. In the preferred embodiment, the significant voltages which will appear on lines 10 and 11 are 0, 7.5 volts and 16 volts. These voltages are provided by the saturation of various combinations of transistors 15, 16, 17, and 18 in conjunction with a current source (not shown) at point 13. Transistors 15 and 16 control the voltage on control line 10. The saturation of transistor 16 will pull line 10 to a ground level. The saturation of transistor 15 provides a voltage drop across resistor 21 which causes line 10 to be held to 7.5 volts in the preferred embodiment. When transistors 15 and 16 are cut off, zener diode 20 holds the voltage on line 10 to 16 volts.

In a similar manner transistors 17 and 18 in conjunction with diode 22 and zener diode 20 provide various output voltage levels on control line 11. It will be understood that when transistors 17 and 18 are nonconducting control line 11 will be at 16 volts.

Since the preferred embodiment of the present invention has two distinct control lines, each of which may carry one of three distinct voltages for any given identifier signal; nine distinct states of control lines 10 and 11 are available as signals. The preferred embodiment defines four of these distinct states as rows one through four and three other distinct states as columns one through three. The preferred embodiment of the present invention uses four rows and three columns that correspond to the 4×3 array of a conventional dual-tone push-button telephone and includes digits 0 through 9 and special characters * (row 4/column 1) and # (row 4/column 3). While it is possible to use other coding schemes in the present invention, it will be apparent to those skilled in the art that the preferred embodiment shown in the drawings uses the scheme shown in the following table to provide identifier signals and to decode same.

| Row Column | Voltages Lines 10 & 10' | Voltages Lines 11 & 11' | Inputs to Decoder 169 D | C | B | A |
|---|---|---|---|---|---|---|
| R1 | 7.5 | 16 | 0 | 0 | 0 | 1 |
| R2 | 0 | 16 | 0 | 0 | 1 | 0 |
| R3 | 16 | 7.5 | 0 | 1 | 0 | 0 |
| R4 | 0 | 0 | 1 | 0 | 0 | 0 |
| C1 | 7.5 | 0 | 1 | 0 | 0 | 1 |
| C2 | 7.5 | 7.5 | 0 | 1 | 0 | 1 |
| C3 | 16 | 16 | 0 | 0 | 0 | 0 |

Structure of the Automatic Station Identifier

The automatic identifier of the preferred embodiment comprises clock 25 which is controlled by NOR gate 26, NOR gate 27 which is associated with switch 28 and an RC circuit comprising resistor 29 and capacitor 30, a decade counter 31 and switching matrix 32 connecting the diode isolated outputs of decade counter 31 to lines 35 through 40. As will be seen in FIG. 1B, lines 35 through 40 are connected to the bases of transistors 15 through 18 and thus control the outputs of these transistors.

In the preferred embodiment an automatic identifier is located at each dictate station but it is possible to locate a plurality of automatic identifiers at a location remote from the dictate stations such as the central switching equipment.

Operation of the Automatic Identifier

For operation of the station identifier in the automatic only mode, the poles of switch 41 are in their upper position so that line 42 is connected to point 45 and line 46 is connected to point 47.

The present invention will further understood by an explanation of the operation of the automatic identifier. Switch 28 represents either a pole of the hook switch of a dictate station, or a pole of a switching device responsive to the dictate station becoming operatively connected to a recorder in the central dictation system by seizure of the recorder. When switch 28 closes, capacitor 30 will be charged through resistor 29 at a rate determined by the values of these components. As will be obvious to those skilled in the art, prior to the closing of switch 28, capacitor 30 will be uncharged providing two logical zeros as inputs to NOR gate 27. In this state, NOR gate 27 will provide a logical one output on line 48 which thus provides a logical one at point 49. As will be known to those skilled in the art, the presence of a logical one at point 49, which is connected to the reset input (RST) of decade counter 31, causes the counter to reset to its zero count state. Also the logical one on line 48 provides a logical one as an input to NOR gate 26 thus providing a zero on line 50 which disables clock 25.

It will therefore be understood by those skilled in the art that upon the closing of switch 28 clock 25 is disabled and decade counter 31 is reset to its zero count until the charge on capacitor 30 reaches a value which provides logical ones as the inputs to NOR gate 27. When this occurs, a zero appears on line 48 which then causes the output 50 of NOR gate 26 to be the inverted value of the logical state appearing on line 51. As may be seen from FIG. 1, line 51 is connected to the Q9 output of decade counter 31 and thus will be in a logical zero state until decade counter 31 counts from zero to nine. Therefore, NOR gate 26 will have two zeros on its input and thus provide a one on line 50 enabling clock 25 to run. The enabling of clock 25 causes a clock signal to appear on line 52 thus causing decade counter 31 to count from zero to nine sequentially.

As will be understood by those skilled in the art, decade counter 31 causes a logical one output to appear, one at a time, on each of its outputs Q1 through Q9 in response to the clock signal on line 52. As may be seen from FIG. 1B, outputs Q1 through Q8 of decade counter 31 are diode coupled through lines 55 to switches 32. Switches 32 represent any combination of switches or a single multipole switch which will tie each of the eight lines shown as 55 to a preselected one of lines 35 through 40. Thus for each count of decade counter 31, a specific set of inputs on the bases of transistors 15 through 18 will be provided and thus provide a characteristic set of the possible output voltages on control lines 10 and 11. For example if output Q2 of decade counter 31 is connected through switches 32 to line 35, transistor 15 will be cut on providing a 7.5 volt output on control lines 10 and transistor 18 will be saturated pulling control line 11 to ground.

As will be understood by those skilled in the art switches 32 may be embodied by a plurality of switches or hardwired connections. As will be further understood by those skilled in the art, when it is desired that the automatic identifier be rendered inoperative in order to use the manual identifier described hereinbelow, lines 55 may be disconnected from lines 35 through 40 and thus switches 32 would represent open circuits. The presence of diodes on lines 55 present outputs Q1 through Q8 from loading lines 70 through 74.

When decade counter 31 has counted from zero to eight, eight combinations of voltages on control lines 10 and 11 have been provided as outputs and thus providing a sequence of identification signals on control lines 10 and 11 identifying the dictate station. Eight combinations of voltages on control lines 10 and 11 are used in the preferred embodiment but it is possible to construct embodiments of the present invention using a greater or lesser number of voltage combinations. When decade counter 31 counts to nine, the Q9 output of decade counter 31 goes high thus placing a logical one on line 51. The one on line 51 causes a zero to appear on line 50 from NOR gate 26 thus disabling clock 25 and terminating operation of decade counter 31. Furthermore the one on line 51 is provided through line 56 to point 45. Recall that for automatic only operation, line 42 is connected to point 45 through a pole of switch 41. Thus the logical one on line 51 appears on line 42 and causes transistor 54 to go into saturation pulling line 12 to ground.

Line 12 is connected to function controls (not shown) associated with dictate station 400. When transistor 54 is cut off, dictate station 400 is rendered unable to provide function control signals which normally control the seized recorder. When transistor 54 is cut on and line 12 has a low impedance path to ground dictation station 400 is enabled to provide normal function control signals.

It can therefore be seen that while decade counter 31 is counting from zero to eight providing signals on control lines 10 and 11, line 12 is in a high impedance state and the recorder to which the dictate station is connected will be seized but the dictate station will be unable to provide function control signals on lines 10' and 11'. It will be further understood that when decade counter 31 counts to nine, line 12 is pulled to ground thus enabling control signals from the dictate station to be provided to the recorder.

Structure of the Manual Identifier

The principal components of the manual identifier as shown in FIGS. 1A and 1B are a row-column keyboard 60, a pair of FIFO shift registers 61 and 62, a pair of one shot multivibrators 65 and 66 and a latch 67. One shot 65 is positive edge-triggered and one shot 66 is negative edge-triggered.

Row-column keyboard 60 is a conventional four by four keyboard pad having four row and four column outputs with column four being unused in the preferred embodiment. As may be seen from FIG. 1A FIFO shift register 61 receives as data inputs the row outputs of keyboard 60. Similarly FIFO shift register 62 receives as data inputs the column outputs of keyboard 60. In accordance with timing circuitry associated with NOR gates 68 and 69 the sequence of row-column signals in shift registers 61 and 62 are provided over lines 70 through 75 to lines 35 through 40 thus providing various voltages on control lines 10 and 11 which correspond to a sequence of row-column inputs from keyboard 60.

FIFO shift registers 61 and 62 are of a type currently available as integrated circuits. The preferred embodiment of the present invention uses 2 four-bit registers having a SHIFT IN (SI) input which will cause data at inputs D0 through D3 to be shifted into the register when a logical one is present on SI. Shift registers 61 and 62 have a negative edge triggered SHIFT OUT (SO) input which removes data from the register. These registers also include an asynchronous MASTER RESET (MR); a DATA-OUT-READY (DOR) output on 62 which goes high when data is available at the outputs Q0 through Q3; and a tri-state (TS) control which will place all data outputs in a high impedance state when provided with a logical one. Of course, other memory devices may be used to store row and column signals.

Operation of the Manual Identifier

The manual identifier of the present invention will be better understood by an explanation of the function of the preferred embodiment thereof. In order to provide manual entry of identification signals in the preferred embodiment, switches 32 are set to disconnect lines 55 from lines 35–40. Instead of setting switches 32 to disconnect lines 55 from lines 35–40, they may be set so as to provide a sequence of row 4, column 1 signals which will be treated as keyboard error signals by the decoder, thus enabling normal provision of manually entered signals. Furthermore the poles of switch 41 are placed in the position shown in FIG. 1B thus connecting line 42 to point 76 and disconnecting line 46 from point 47.

The sequence of operation begins, as with the automatic identifier, with the closing of switch 28. The resultant one which appears on line 48 from NOR gate 27 again resets decade counter 31 and further provides a one at point 77. As may be seen from FIG. 1A, point 77 is an input to NOR gate latch 67 and it will be further understood that a one at point 77 forces latch 67 into a state where line 78 is low and line 79 is high. The zero on line 78 appears at point 76 and thus on line 42 thereby keeping transistor 54 cut off and line 12 in its high impedance state. This prevents the recorder from responding to signals on lines 10 and 11 as function control signals. The one on line 79 provides a one input to AND gate 80 thus making the output on line 81 the same as the input at point 82. As may be seen from FIG. 1B, point 82 is connected to line 56 which is in turn connected to line 51 and is thus equivalent to the Q9 output of decade counter 31. So long as decade counter 31 is in any state other than its nine count, a zero will appear on line 81 thus preventing operation of one shots 65 and 66 since line 81 is connected to the inverted direct clear inputs of these one shots.

When capacitor 30 charges to a level sufficient to put ones on the inputs of NOR gate 27, a zero again appears on line 48. This zero linkwise appears at point 77 and leaves latch 67 in a stable state so long as a zero appears on line 85. As previously explained, the appearance of a zero on line 48 causes line 50 to go high enabling clock 25 and causing decade counter 31 to count from zero to nine. Since switches 32 are open circuits for operation of the manual identifier, decade counter 31 will count from zero to eight with no effect on the apparatus.

When decade counter 31 reaches its nine count, a one appears on line 51 disabling clock 25 as previously explained and thus holding decade counter 31 in its nine count state. The one on line 51 likewise appears on line 56 and thus at point 82 thereby causing both inputs to AND gate 80 to be one and providing a one on line 81. The appearance of a one on line 81 enables one shots 65 and 66 since line 81 is connected to the inverted direct clear inputs thereof. With the appearance of a one on line 81, the identifier is in a state in which it is prepared to receive the outputs of shift registers 61 and 62 and provide them on lines 70 through 75.

As will be apparent to those skilled in the art from the foregoing description, decade counter 31 counts from zero to nine both when the preferred embodiment of the present invention is operated as an automatic identifier and as a manual identifier. It may further be seen that switches 32 and switch 41 serve as a switching means which determines whether or not lines 10, 11, and 12 are responsive to the count of decade counter 31 and thus switches 32 and switch 41 serve as a switching means in the preferred embodiment for switching from the automatic to the manual mode of operation.

While decade counter 31 was counting from zero to nine, it was possible that the operator of the dictate station would have been making entries of a particular identification sequence on keyboard 60. As noted above, keyboard 60 is a conventional four by four keyboard with four row and four column outputs as shown in the block labeled 60 in FIG. 1A. From FIG. 1A it may be seen that lines 86 through 89 correspond to outputs for row one through row four respectively. Similarly lines 90 through 92 correspond to columns one through three respectively. As will be apparent to those skilled in the art, the resistor arrays 95 and 96 correspond to hard wired OR connections for the row and column lines respectively and thus a one will appear on line 97 when any of the row lines 86 through 89 have a one and likewise a one will appear on line 98 when any of the column lines 90 through 92 have a one. Lines 97 and 98 are the inputs to AND gate 99 and thus line 110 will go high whenever both a row and a column line (except column 4 which is not connected) both have a logical one thereon. Thus it may be seen that AND gate 99 provides a logical one on line 110 whenever operation of the keyboard has provided a one on both a row and a column, indicating the successful depression of a key.

Line 110 is connected to an RC network comprising resistors 111 and 112 and capacitor 115. This network is provided to prevent spurious outputs from AND gate 99 from appearing on line 116 due to contact bounce in the physical keyboard which is represented by 60 in FIG. 1A. When a one on line 110 has appeared for a sufficient time to charge capacitor 115, a one appears on line 116. As will be apparent to those skilled in the art, the presence of AND gate 117 with feedback provided by resistor 118 provides a Schmitt trigger which causes a sharp transistion from zero to one on line 119 in response to the relatively slow transition from zero to one on line 116. It may thus be seen that when a stable one appears on both lines 97 and 98, a one will appear on line 119.

As may be seen from FIG. 1A, line 119 is connected to the SHIFT IN (SI) inputs of FIFO shift registers 61 and 62 and will thus cause data apparing on lines 86 through 92 to be shifted into shift registers 61 and 62. This process of shifting data into registers 61 and 62 will take place without regard to the state of decade counter 31. It will be assumed below that all the data representing the manually entered identification signal has been entered prior to decade counter 31 reaches its nine count state. However it will be apparent to those skilled in the art that it makes no difference in the operation of the preferred embodiment whether the shifting of data into registers 61 and 62 is completed before or after decade counter 31 reaches its Q9 count.

As explained above, as soon as valid data from lines 86 through 89 have rippled through to the outputs of row shift register 61, the DATA OUT READY (DOR) output goes high providing a one on line 120. As previously explained, the arrival of decade counter 31 at its nine count state causes a one to appear on line 81 (from AND gate 80) thus causing a one to appear at point 121. The concurrent presence of a one on line 120 from the DATA OUT READY output of register 61 and a one at point 121 causes AND gate 122 to provide a one on line 125. The appearance of a one on line 125 causes positive edge-triggered one shot 65 to fire thus placing a one output on line 126 for a duration of time determined by the timing circuitry associated with positive edge triggered one shot 65.

As may be seen from FIG. 1A, line 126 provides the input to negative edge triggered one shot 66 and therefore the transition from zero to one on line 126 will not affect one shot 66 and line 127 will remain in a zero state and line 128 will be one. In the preferred embodiment of the present invention, the outputs of shift registers 61 and 62 are provided along lines 70 through 75 in a row-column sequence. The identification signals of the preferred embodiment correspond to a four digit number, each digit corresponding to a row and a column from keyboard 60. It may thus be seen that eight distinct outputs must appear on lines 70 through 75 to provide four digits, each digit being represented by a row and a column. As was shown above, during the automatic operation of the identifier, eight distinct outputs are provided along lines 55 by the outputs of decade counter 31. These outputs also correspond to row and column values for the four digit identification number of the preferred embodiment. It will therefore be apparent to those skilled in the art that it is necessary to sequentially connect the output of FIFO shift register 61 which contains row signals to lines 35 through 40 and alternately to connect the outputs of FIFO shift register 62 to lines 35 through 40 in order to provide a row-column sequence of signals to operate transistors 15 through 18.

This alternate provision of a row signal and then a column signal is provided by the circuitry comprising NOR gates 68 and 69, capacitor 129, resistor 131, and one shots 65 and 66.

When line 126 goes high from the triggering of one shot 65, a one appears on input 132 of NOR gate 68. Since line 128 has carried a one for a relatively long period of time, capacitor 129 will have charged leaving a zero on line 130. Thus the appearance of a one at input 132 of NOR gate 68 causes a zero to appear on line 135 thus placing a zero on the tri-state (TS) input of row shift register 61. The appearance of a zero on the tri-state input of shift register 61 connects outputs Q0 through Q3 of shift register 61 to lines 70 through 73 respectively. Thus it may be seen that the first time positive edge triggered one shot 65 fires, the first row signal comprising the four bits present on the outputs of row shift register 61 (only one of which will be a one) to appear on lines 70 through 73 and thus on lines 37 through 40 to control the states of transistors 15 through 18 and thereby determine the voltages which appear on control lines 10 and 11. Therefore, when line 135 to the tri-state input of row shift register 61 goes low, the voltages present on control lines 10 and 11 will be determined by the outputs Q0 through Q3 of shift register 61.

Note that in the state described, a zero appears on line 130 and likewise on line 127 causing NOR gate 69 to provide a one on line 136 which is connected to the tri-state (TS) input of column shift register 62. The presence of a one on this tri-state input places the outputs of column shift register 62 in a high impedance condition effectively disconnecting them from lines 74 and 75.

When positive edge-triggered one shot 65 has timed out, line 126 goes from one to zero thus providing the negative edge which triggers negative edge-triggered one shot 66. The zero which now appears on line 126 likewise appears at input 132 to NOR gate 68 thus causing line 135 to go high and activating the tri-state input to row shift register 61. It is to be noted that at the same time line 132 goes to zero, line 128 likewise goes to zero. Recall that capacitor 129 was previously charged and does not discharge instantly; therefore line 130 is momentarily driven below ground. However, NOR gate 68 still "sees" 130 as being a zero so that previously described transition from zero to one on line 135 takes place.

The appearance of a one on line 127 due to the firing of one shot 66 provides a one input to NOR gate 69 thus causing a zero to appear on line 136 which is connected to the tri-state input of column shift register 62. As will be apparent to those skilled in the art, the control circuitry of NOR gates 68 and 69 have now provided a one to the tri-state input of shift register 61 effectively disconnecting it from lines 70 through 73; and a zero to the tri-state input of column shift register 62 thus providing the data outputs Q1 and Q2 of shift register 62 to lines 74 and 75, respectively. Lines 74 and 75 are connected to lines 36 and 35, respectively, and thus in the state just previously described, transistors 15 through 18 are controlled by outputs Q1 and Q2 of column shift register 62 and unaffected by the outputs of row shift register 61 since the data outputs thereof are in their high impedance state.

Thus it may be seen that the operation of the manual identifier described thus far has provided first a row signal and then a column signal which have appeared as a combination of voltages on control lines 10 and 11. It will further be apparent that the row and column signal provided so far have corresponded to the row and column for the first identifying digit entered at keyboard 60.

When one shot 66 times out, line 127 goes to zero and line 128 goes to one. The transition from one to zero on line 127 also appears on line 137 which is connected to the shift out (SO) inputs of shift registers 61 and 62. The shift registers used in the preferred embodiment require a falling edge on the SHIFT OUT inputs in order to shift data out of the shift register and provide the next set of sequential bits as outputs. Furthermore, in order to shift data out of the shift registers, the tri-state (TS) inputs must be in a logical zero state. This condition is provided by the timing circuitry comprising capacitor 129 and resistor 131. The values of these components are selected to provide a time constant which is short enough to prevent the short simultaneous appearance of outputs from both shift register 61 and 62 from causing transistors 15-18 to change state. Recall that some time after line 128 has been in its zero state, capacitor 129 has discharged. When negative edge-triggered one shot 66 times out and line 128 goes high, capacitor 129 does not charge instantly and therefore a one appears on line 130 until capacitor 129 is charged sufficiently to take line 130 to a zero state. During the time a one appears on line 130, NOR gates 68 and 69 both provide zeros on lines 135 and 136 respectively thus placing a zero on the tri-state (TS) inputs of both shift registers 61 and 62. This time corresponds to the time during which a falling edge appears on lines 127 and 137 thus allowing shift registers 61 and 62 to shift out the previous data and bring the next set of bits to their outputs. The shifting out of the previous data automatically causes the next set of data bits to ripple through to the outputs of shift registers 61 and 62. In shift registers of the type used in the preferred embodiment, the DATA-OUT-READY output of row shift register 61 goes low when a falling edge appears on the SHIFT OUT input thus causing a zero to appear on line 120 and thus on line 125 due to the action of AND gate 122. It can therefore be seen that the foregoing description of operation has described a sequence beginning with a provision of the row signal from row shift register 61 to lines 35 through 38, followed by the provision of a column signal from column shift register 62 to lines 39 and 40; this being followed by a shifting out of the old data and the data-out-ready output of row shift register 61 going low.

As will be apparent to those skilled in the art, the above sequence has placed the manual identifier in an identical state to that in which it was described when the first set of valid data appeared at the outputs of shift registers 61 and 62 and thus the reappearance of a one on line 120 from the data-out-ready output of row shift register 61 will again cause a one to appear on line 125 from AND gate 122 and trigger positive edge-triggered one shot 65 thus beginning another cycle. This sequence of events takes place so long as a one does not appear on the Q0 output of column shift register 62.

As may be seen from FIG. 1A, the D0 input to column shift register 62 is line 140 which is the output of AND gate 141. As may further be seen from FIG. 1A, the inputs to AND gate 141 are lines 89 and 92 corresponding to row four and column three respectively. In the preferred embodiment of the present invention row four/column three corresponds to a character which signifies the end of manual entry of an identification number at keyboard 60. When the key corresponding to row four/column three is depressed, a one is provided to line 140 by AND gate 141 and thus a one appears at the D0 input of column shift register 62. Since column shift register 62 is a FIFO shift register, this last signal in the last signal to appear on the outputs of column shift register 62. Therefore the last data to appear at the output of column shift register 62 will contain a one on line 142 from the Q0 output and zeros on lines 74 and 75. The appearance of a one on line 142 causes a one to appear at input 85 of latch 67. As will be apparent to those skilled in the art, the appearance of ths one at input 85 causes latch 67 to toggle thus placing a one on line 78 and a zero on line 79. The appearance of a zero on line 79 puts a zero on one input to AND gate 80 thus placing a zero on line 81 which terminates the operation of one shots 65 and 66. The appearance of a one on line 78 corresonds to a one appearing at point 76 and thus one line 42. Recall that a one on line 42 saturates transistor 54 thus pulling line 12 to a low impedance connection with ground and providing for enablement of the recorder.

It should therefore be apparent that during manual operation of the station identifier, a sequence of key signals comprising row signals and column signals from keyboard 60 are entered into shift registers 61 and 62 followed by a row four/column three signal which indicates the end of the identification sequence from the keyboard. These row and column signals ripple through shift registers 61 and 62, and due to the operation of the circuitry associated with NOR gates 68 and 69, are sequentially provided as inputs to transistors 15 through 18 in a row-column sequence. The appearance of the final keyboard signal, row four/column three, causes the switching means embodied by transistor 54 to pull line 12 to ground thus allowing the dictate station to provide control signals to the recorder. Since some of the identifier signals of the preferred embodiment are electrically identical to some function control signals, an embodiment of the present invention may be constructed wherein the dictate station's normal function control switches are used to generate identifier signals. In such an embodiment, line 12 as shown in FIG. 1B would be omitted.

Auto/Manual Operation

From the foregoing it will be apparent that the identifier of the present invention can be operated in a hybrid mode using both the automatic and manual identifiers. For example, the first two digits from the automatic identifier could be keyboard error signals (row 4, column 1) and the second two could be a two digit code identifying the dictate station. Then a two digit code identifying the dictator may be entered manually to complete the identification sequence. This may be accomplished by appropriate manipulation of switches 32 and maintaining switch 41 in the position shown in FIG. 1B.

Structure of the Decoder of the Preferred Embodiment

Figure 2A:
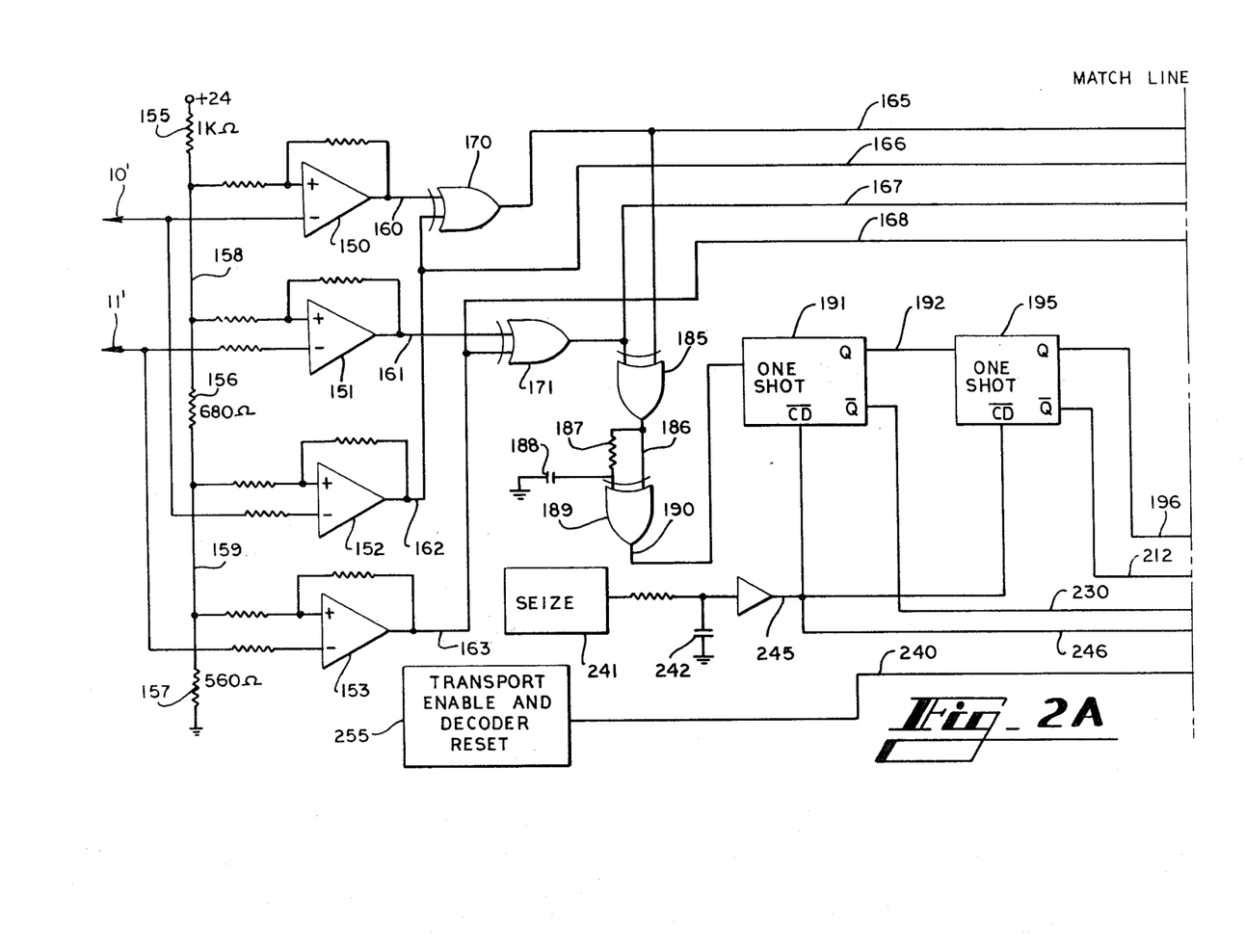
FIGS. 2A and 2B are a schematic diagram of a preferred embodiment of the decoding and receiving apparatus of the present invention, FIGS. 2A and 2B being joined along a match line.
Figure 2B:
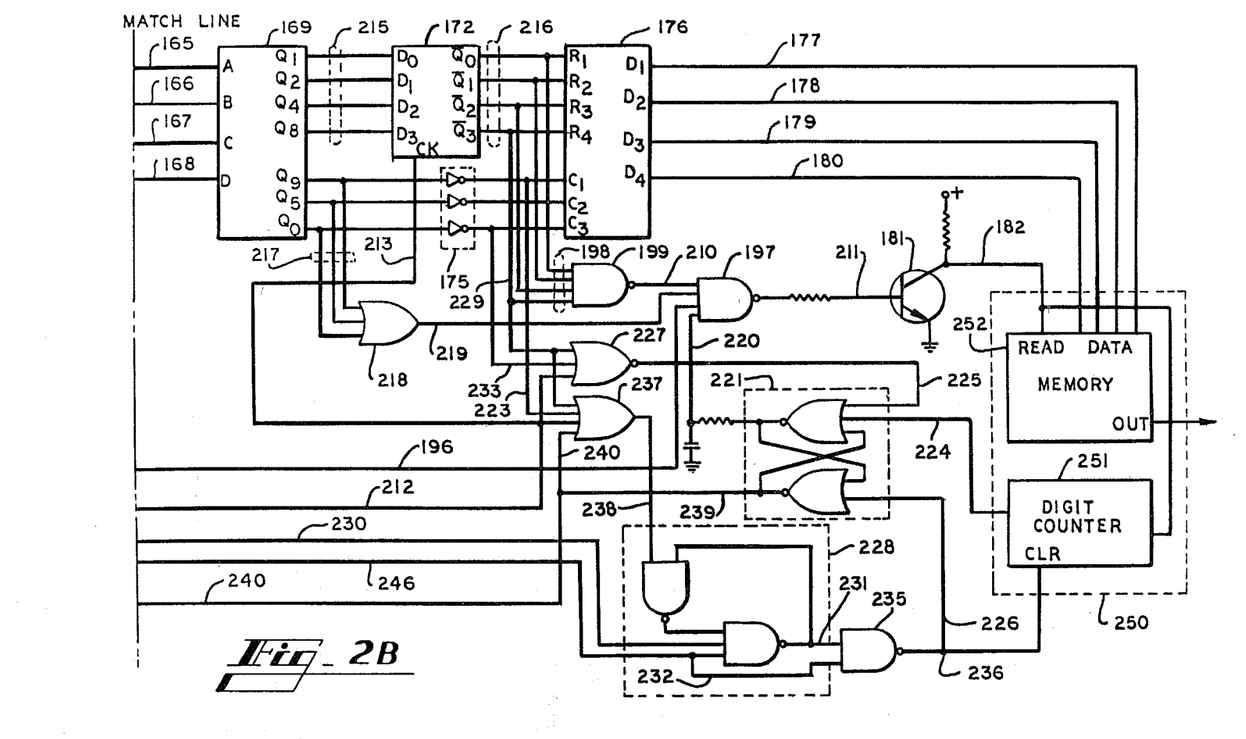

Turning to FIGS. 2A and 2B, the structure of the preferred embodiment of the decoder of the present invention may be seen. Lines 10' and 11' are directly connected to lines 10 and 11 as shown in FIG. 1B through a switching means provided by a central control system in a central dictation circuit. This circuit is not shown herein but such circuits are well known in the art and may be provided by manual switches or by automatic control circuitry. It should be understood that a voltage appearing on line 10 of FIG. 1B will appear at line 10' of FIG. 2A and similarly a voltage on line 11 of FIG. 1B will appear on line 11' of FIG. 2A. Line 10' is provided as an input to the inverting inputs of comparators 150 and 152. The voltage on line 11' is provided to the inverting inputs of comparators 151 and 153. Reference voltages for these comparators are provided by a resistive voltage divider comprising resistors 155 through 157. From the values shown for resistances 155 through 157 it will be apparent to those skilled in the art that the voltage appearing on line 158 as the reference voltage to comparators 150 and 151 is approximately 13.3 volts. Likewise it will be apparent to those skilled in the art that the voltage on line 159, which is the reference voltage to comparators 152 and 153, will be approximately 6 volts. Thus it may be seen that comparators 150 through 153 provide outputs in response to the voltages on lines 10' and 11' being between zero and six volts, between six volts and 13.3 volts, and greater than 13.3 volts. As previously explained, the voltages provided on lines 10' and 11' are 0, 7.5, and 16 volts which allow for unambiguous comparator outputs when transistors 15 through 18 shown in FIG. 1B are operating properly.

As will be apparent to those skilled in the art, comparators 150 through 153 require conventional level shifting circuits to clamp the logical one output state to a voltage that is compatible with other circuitry shown in FIG. 2. This level shifting circuitry is conventional in nature and has been omitted for the sake of clarity.

The outputs of comparators 150 through 153 appear on lines 160 through 163 respectively. As will be apparent to those skilled in the art, line 160 is in its logical zero state when line 10' is at 16 volts and in its logical one state when line 10' is at 7.5 volts or ground. Line 161 responds to the voltage on line 11' in a similar manner. As will further be apparent, line 162 will be in its logical one state when line 10' is at ground and otherwise be in its logical zero state. Similarly, line 163 responds to the voltage on line 11'.

The outputs of comparators 150 through 153 are provided either directly, or through EXCLUSIVE OR gates 170 and 171 as inputs 165 through 168 of BCD to one of ten decoder 169. Input 165 to decoder 169 is the least significant bit and input 168 is the most significant bit. As may be seen from FIG. 2A, input 166 to BCD to one of ten decoder 169 is identical to the output of comparator 152 appearing on line 162 and likewise input 168 to decoder 169 is identical to the output of comparator 153 appearing on line 163. Input 165 to decoder 169 is provided by EXCLUSIVE OR gate 170 which has as its inputs lines 160 and 162. Similarly input 167 of decoder 169 is provided by the output of EXCLUSIVE OR gate 171 whose inputs comprise lines 161 and 163.

As may be seen from FIG. 2B, the outputs Q1, Q2, Q4, and Q8, of decoder 169 are transferred to inverting D-type latches 172 which will be referred to as the row latches. The control of this transfer is implemented by timing circuitry which will be described hereinbelow. Outputs Q0, Q5 and Q9 of decoder 169 are inverted by inverter array 175 and thus the inverted outputs of decoder 179 are provided as inputs to row/column to binary decoder 176. The outputs of row-column to binary decoder 176 provide a four bit binary number corresponding to a number provided by the identifier shown in FIGS. 1A and 1B which appears on lines 177 through 180. Transistor 181 controls line 182 which provides a strobe output indicating the data is ready on lines 177 through 180. The control of transistor 181 is provided through the timing circuitry described hereinbelow.

The preferred embodiment of the present invention recognizes a row four/column three signal (#) an end of identifier sequence signal and a row four/column one (*) as a keyboard errror signal. Gates 227 and 237, respectively, detect the presence of these signals.

Operation of the Decoder

The decoder of the present invention will be more clearly understood in light of the following description of the function of its timing circuitry. As the voltage levels on lines 10' and 11' change, the outputs of EXCLUSIVE OR gates 170 and 171 likewise change. As is known to those skilled in the art, the probability of two outputs of two comparators such as those driving line 160 and 162 both inverting simultaneously is quite low. Therefore, whenever a level shift is detected on line 10' by comparators 150 and 152, EXCLUSIVE OR gate 170 will, for a short period, change state. EXCLUSIVE OR gate 171 will respond in a similar manner to voltage charges on line 11'. However, should it be discovered that a selection of physical components was made such that the output states of these comparators change in a synchronous manner, the addition of a small capacitance on one of the outputs would provide the necessary lag to assure that EXCLUSIVE OR gate 170 was responsive to changes on the outputs of comparators 150 and 152. It can thus be seen that inputs 165 and 167 to BCD to one of ten decoder 169 will contain a plurality of small pulses or spikes when the voltage levels on lines 10' and 11' are changing. Inputs 165 and 167 are provided as inputs to EXCLUSIVE OR gate 185 whose output 186 is connected as one input to EXCLUSIVE OR gate 189. The other input to EXCLUSIVE OR gate 189 is provided at one end of capacitor 188 which is connected to output 186 through resistor 187. As will be obvious to those skilled in the art, the direct connection of one input of exclusive OR gate 189 to line 186 coupled with the other input being damped through resistor 187 and capacitor 188, will assure that whenever a transition takes place on line 186, for some period of time the two inputs to EXCLUSIVE OR gate 189 will have opposite logical states and therefore EXCLUSIVE OR gate 189 will provide a pulse on line 190 whenever line 186 changes state.

Line 190 is provided as the input to a positive edge-triggered retriggerable one shot 191, the output of which appears on line 192 as the input to negative edge-triggered one shot 195. It may thus be seen that when voltage levels are changing on lines 10' and 11', EX-CLUSIVE OR gate 185 will be responsive to these changes and in turn EXCLUSIVE OR gate 189 will be responsive to these changes and provide a series of pulses along line 190 until the voltage levels on lines 10' and 11' have settled. Since one-shot 191 is retriggerable, it will be triggered on the first pulse which appears on line 190 and will continue to be triggered without ever timing out until line 190 remains zero for a sufficient length of time. This will occur when line 186 has settled to a stable one or a stable zero. It will thus be understood by those skilled in the art that EXCLUSIVE OR gates 185 and 189 and one-shot 191 provide the means for detecting both the presence of voltage changes on lines 10' and 11' and the subsequent settling of the voltages on these lines to new values.

When one-shot 191 times out, a falling edge appears on line 192 which triggers negative edge-triggered one shot 195. The first level changes which appeared on lines 10' and 11' correspond to the first row signal of a series of identifier signals coming into the decoder. The firing of negative edge triggered one-shot 195 provides a one on line 196 which in turn is provided as an input to NAND gate 197. However, since the first row signal is present on the inputs to BCD to one of ten decoder 169, the outputs of row latch 172 will all be one since row latch 172 has yet to be clocked. Thus it may be seen that all of the lines 198 which are provided as inputs to NAND gate 199 will be one and therefore a zero will be provided on line 210. The zero on line 210 is provided as one input to NAND gate 197 thus assuring that line 211 remains in a logical one state and thus saturates transistor 181 keeping line 182 pulled to ground.

When one-shot 195 times out, a rising edge appears on line 212 which is provided to line 213 which is the clock (CK) input to row latch 172. This clocks row latch 172. It will be understood by those skilled in the art that row latch 172 comprises four positive edge-triggered D-type flip-flops with inverted outputs. The clocking of row latch 172 provides the logical inverse of the row outputs 215 of decoder 169 as outputs 216 of row latch 172. As will be explained below in explanation of the coding scheme and truth tables used in the preferred embodiment, for a row signal one of lines 215 will contain a one and thus one of lines 216 will contain a zero after row latch 172 has been clocked. Since lines 216 correspond to lines 198, the provision of a zero on one of lines 198 causes NAND gate 199 to provide a one line 210.

The next transition of voltage values on lines 10' and 11' will correspond to a column signal entering the decoder. As described above, one shot 191 will time out when these voltage values have become stable and one-shot 195 will be triggered. The firing of one-shot 195 again provides a one input along line 196 to NAND gate 197. Since a column input is present, one of the outputs Q0, Q5, or Q9 of decoder 169 which are connected to lines 217 will be a one. From the foregoing description of the operations of one shots 191 and 195, it will be apparent that the logic levels on lines 217 will have stablized at the time one-shot 195 fires.

The presence of a logical one on one of lines 217 assures that OR gate 218 will provide a one along line 219 which is another input to NAND gate 197. The fourth input to NAND gate 197 is provided along line 220 from latch 221. The inputs to NOR gate latch 221 are provided on lines 225 and 226 from NOR gate 227 and NAND gate latch 228, respectively, and on line 224 from digit counter 251. It will be apparent to those skilled in the art that line 226 will remain at a logical zero state during normal operation of the decoder.

NOR gate 227 has as inputs line 212 from one shot 195, line 233 and line 229. Line 233 corresponds to the inverted Q0 output of decoder 169 and a zero thereon corresponds to a column three signal. Line 229 corresponds to the Q3 output of row latch 172 and a zero thereon corresponds to a row four signal. In the description of the decoder supra it was explained that a row four column three signal represented an end of identifier sequence signal. Therefore so long as identifier signals other than the end of identifier signal are being provided by decoder 169 and row latch 172, at least one of lines 228 and 229 will have a one thereon thus maintaining a zero on line 225 through the action of NOR gate 227. The one from line 212 which is provided as an input to NOR gate 227 when one shot 195 has timed out assures that line 225 remains in its logical zero state while voltage levels are shifting on lines 10' and 11'.

When the recorder is seized by a dictate station, a logical one is provided by seizure sensor 241. Capacitor 242 maintains a zero on line 245 momentarily. This zero clears one shots 191 and 195 and further appears on line 246. Since line 232 is directly connected to line 246, this state of the machine provides a one and a zero as inputs to NAND gate 235. A one and a zero on NAND gate 235 causes a one to appear at point 236 which clears digit counter 251 and is also provided along line 226 as an input to the lower NOR gate of NOR gate latch 221. As will be known to those skilled in the art, the one on line 226 forces line 220 to its logical one state and that line 220 will remain in its logical one state until a one appears on line 224 or line 225 clearing NOR gate latch 221.

It may therefore be seen that when a zero appears on one of lines 216 corresponding to the presence of a row signal, and a one appears on one of lines 217 corresponding to a column signal, NAND gate 199 and OR gate 218 respectively will provide ones as inputs on lines 210 and 219 to NAND gate 197. Since line 220 is in a one state, the firing of one shot 195 provides a fourth one as an input to NAND gate 197 from line 196 and thus all inputs to NAND gate 197 are one and a logical zero appears on line 211. The presence of a logical zero on line 211 cuts transistor 181 off thus causing a voltage rise on line 182. When one shot 195 times out, a zero again appears on line 196 causing NAND gate 197 to return line 211 to its logical one state thus taking line 182 virtually to ground.

From the foregoing it will be apparent to those skilled in the art that when a stable row signal and a stable column signal are present as inputs to row column to binary converter 176, and one shot 195 fires, a voltage pulse appears on line 182 and thus indicating that lines 177 through 180 contain valid data to be recorded.

The pulse on line 182 signals to memory device 252 that the data present on lines 177 through 180 are to be read into memory. A pulse on line 182 further increments digit counter 251 which counts the number of digits of the identification code which have been read into memory. Memory device 252 may be a memory device associated with a particular recorder as is shown in the preferred embodiment, or may be part of a remote memory. It will be apparent to those skilled in the art that signals corresponding to the signals present on lines 177–180 may be recorded directly onto the tape of the recorder upon each occurrence of a pulse on line 182.

A row four/column one signal corresponds to a signal entered by the operator of the encoder that a mistake has been made on the keyboard entry and that a new sequence of identification digits will follow. When a row four/column one signal is entered into the decoder shown in FIGS. 2A and 2B its presence is detected by OR gate 237. When a row four signal has been set on row latch 172, a zero appears on line 229 which is provided as an input to OR gate 237. The presence of a column one signal in BCD to one of ten decoder 169 provides a zero on line 223 which is also an input to OR gate 237. A zero will be present on line 239 and thus on line 240 from NOR gate latch 221. The fourth input to OR gate 237 is from line 212 from negative edge triggered one shot 195. Thus it may be seen that when a row four/column one signal is detected by the decoder, and only when a row four/column one signal is detected, all inputs to OR gate 237 will be zero and a zero will appear on line 238. The zero on line 238 toggles NAND gate latch 228 providing a zero on line 231 as one input to NAND gate 235. The other input to NAND gate 235 is line 232 which is holding a logical one from seize detector 241 and thus point 236 will go to a logical one. The logical one from point 236 clears digit counter 251 and maintains the set state of NOR gate latch 221. The next appearance of a zero on line 230 from one shot 191 will retoggle latch 228 thus reestablishing the zero at point 236.

Thus it may be seen that the presence of row four/column one signal in the preferred embodiment of the decoder resets the digit counter 251 of memory device 250 thus allowing four new digits to be entered.

When four valid digits have been entered into memory device 250, digit counter 251 provides a one along line 224 clearing NOR gate latch 221 and forcing line 220 to its logical zero state and line 239 to its logical one state.

As previously explained the presence of a row four/column three signal in the decoder is decoded by NOR gate 227 which will provide a one on line 225 also clearing NOR gate latch 221. Therefore it may be seen that the detection of a row four/column three signal or the counting of digit counter 251 to a predetermined number will clear NOR gate latch 221.

When NOR gate latch 221 clears, the zero on line 220 maintains a one on line 211 thus keeping transistor 181 saturated and preventing further pulses from appearing on line 182. The one that appears on line 239 is provided on line 240 to transport enable and decoder reset 255 that represents circuitry which enables the decoding mechanism associated with a recorder transport to decode and respond to signals present on lines 10' and 11' and thus make the recorder available for normal operation by the dictate station.

From the foregoing it may be seen that NOR gate latch 221 serves as a switching means for alternately rendering either the decoder of the present invention or the transport controls of the recorder responsive to signals on lines 10' and 11'.

Furthermore it may be seen that latches 221 and 228 provide a means for rendering the recorder unresponsive to control signals upon the activation of seize circuit 241. The recorder will not subsequently be rendered responsive to control signals until latch 221 responds to an end of identifier sequence signal or to a predetermined number of signals detected by counter 251.

The Identification Signal Verifier

Figure 3:
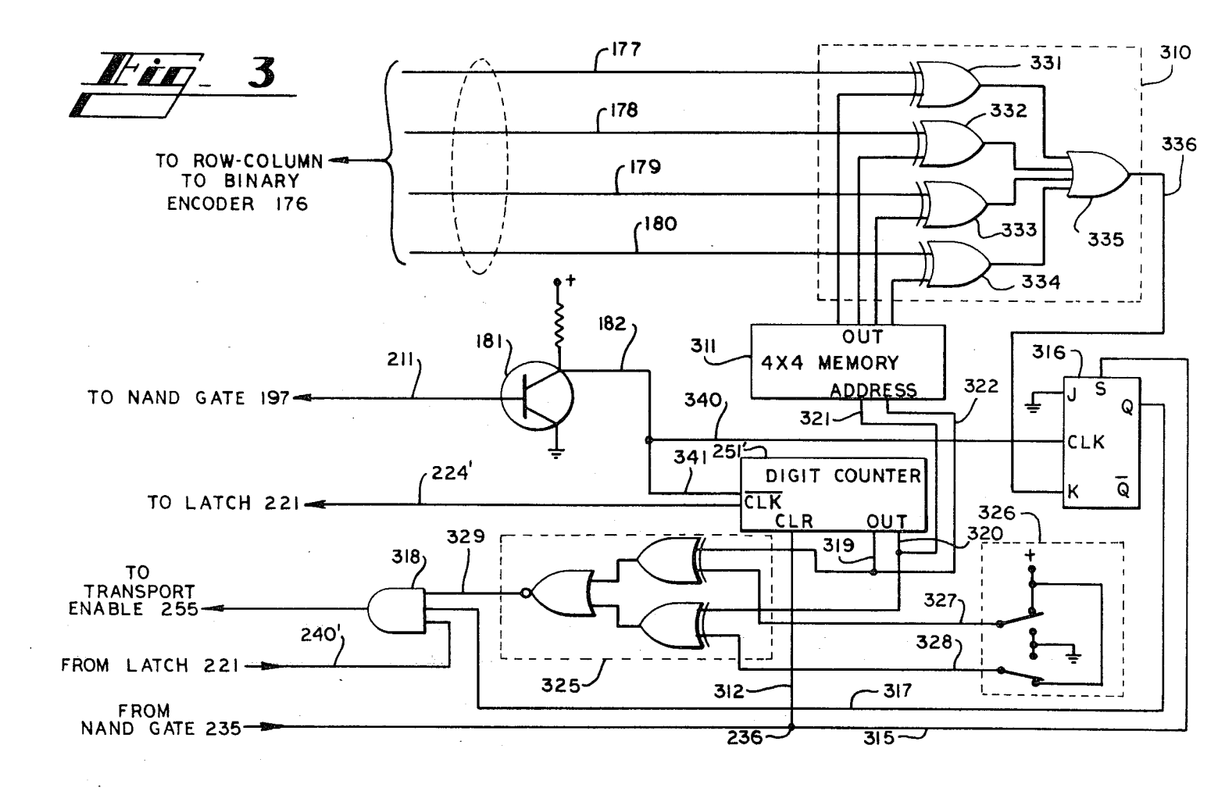
FIG. 3 is a schematic diagram of the preferred embodiment of the verification circuit of the present invention.

A preferred embodiment of the identifier signal verification apparatus of the present invention is shown in FIG. 3. FIG. 3 shows various connections to components shown in FIGS. 2A and 2B. In FIG. 3, elements referenced by the same reference numerals as elements in FIGS. 2A and 2B represent the same elements. When the identifier signal verification apparatus is used, memory 252 as shown in FIG. 2B is unnecessary and the binary outputs of row/column to binary converter 176 (as shown in FIG. 2B) are provided along lines 177–180 directly to digital comparer 310.

While the preferred embodiment of the verifier is shown as located at each recorder, it is possible that a plurality of signal verifiers could be located at a remote location and enable transport controls through a control line.

Recall that the verification apparatus is used in applications wherein it is desirable that a particular recorder may not be operated unless a predetermined valid identifier sequence is received at the recorder. Such a situation generally implies use of the manual identifier, but of course it is possible that certain dictate stations could be provided with an automatic identifier providing a valid sequence, and other dictate stations would require that the valid sequence be entered manually.

In the embodiment shown in FIG. 3, only a single valid 4-digit signal is contemplated and is stored in 4×4 memory 311. Of course it is possible to have a plurality of valid identifier signals stored in a larger memory device. Digit counter 251' corresponds to digit counter 251 shown in FIG. 2B except that it is triggered on a negative clock edge. The output of digit counter 251' is provided along line 224' to latch 221 at the terminal thereto corresponding to line 224 shown in FIG. 2B. Point 236 as shown in FIG. 3 is identical to point 236 shown in FIG. 2B. Recall that a momentary one appears at point 236 whenever the recorder is seized, or a keyboard error signal is decoded. The momentary one appearing at point 236 under these conditions is provided along line 312 to the clear (CLR) input to digit counter 251'. This momentary one is also provided along line 315 to the asynchronous set input of JK flip-flop 316. When a one is received at the asynchronous set (S) input to JK flip-flop 316, a one is provided at the Q output of the flip-flop along line 317 which serves as one input to AND gate 318.

In the preferred embodiment shown in FIG. 3, digit counter 251' has a two bit output provided on lines 319 and 320. This two bit output is provided along lines 321 and 322 to the address input of memory device 311. The output on lines 319 and 320 is also provided as inputs to a second digital comparator 325. The other two inputs to digital comparator 325 are provided by the number of digits selector 326. As may be seen from FIG. 3, the preferred embodiment of selector 326 comprises two single pole double throw switches which may be set to provide either a one or a zero on each of lines 327 and 328. The output of selector 326 corresponds to the number of digits in the valid identifier signal and as shown in FIG. 3, four digits are required (binary 00 through binary 11). As will be apparent to those skilled in the art, the output on line 329 of digital comparator 325 will be a one if and only if the logic state on line 319 is the same as that on line 327 and the logic state on line 320 is the same as that on line 328. Therefore, it may be seen that line 329 will contain a logical one only when the count of digit counter 251' corresponds to the preselected number of digits provided by selector 326.

As will also be apparent to those skilled in the art, digital comparator 310 will provide a zero output only when each bit of the output of memory device 311, correspond to a particular bit on lines 177 through 180. When any of these pairs of bits differ, the output of one of the exclusive OR gates 331 through 334 will become one, and through the action of OR gate 335, will provide a one on line 336 to the K input of JK flip-flop 316.

Recall from the description of the preferred embodiment of the decoder, that NAND gate 197 provides a negative going pulse on line 211 when valid data is present on lines 177–180. This is inverted by transistor 181, which provides a positive pulse on line 182. Line 182 is connected to lines 340 and 341. Line 340 provides the pulse from transistor 181 to the clock (CLK) input of JK flip-flop 316. This pulse is also provided along line 341 to the clock input of digit counter 251' which is shown as having a negative edge-triggered clock. Therefore, when the first stable binary number appears on lines 177–180, a pulse will appear on lines 340 and 341. Since digit counter 251' is negative edge-triggered, its outputs which are provided to lines 321 and 322 will both be zero and therefore will select the zero address location of memory device 311. The output of the zero address of memory device 311 is then compared by digital comparator 310 with the binary number appearing on lines 177–180. If all bits of these two numbers compare favorably, a zero is provided along line 366 to the K input of JK flip-flop 316.

Since the J input of flip-flop 316 is grounded (logical zero) and the flip-flop was asynchronously set by the pulse on line 315 when the recorder was seized, two zeros will be present on the inputs to flip-flop 316 when the clock pulse appears on line 340 and therefore flip-flop 316 will remain in its Q equals one state. When the falling edge of the pulse on line 182 appears on line 341, digit counter 251' will increment, providing a one output on lines 320 and 322 thus selecting the binary number located in memory location one of memory 311. Thus, the output of memory device 311 will be set to compare the second incoming digit on lines 177–180 upon the next occurrence of a pulse on line 182. For normal operation through a valid four-digit identifier signal, the above described sequence will continue until the fourth four-bit binary number has appeared on lines 177–180. Since, under these conditions, comparator 310 has provided a zero along line 336 each time the clock pulse appeared on line 340, line 317 will remain in its logical one state. When digit counter 251' clocks to its binary one one state, a logical one will appear on lines 319, 320, 327, and 328, and therefore a logical one will appear on line 329.

Recall from the description of the operation of latch 221 shown in FIG. 2B, the end of an identifier sequence signal or the provision of an output on line 224 will toggle latch 221. Line 224' shown in FIG. 3 corresponds to line 224 shown in FIG. 2B and line 240' of FIG. 3 corresponds to line 240 of FIG. 2B. Therefore it may be seen that line 240' will provide a one at the end of a sequence of identifier signals. Under these conditions all three inputs to AND gate 318 will be one and a logical one will appear on line 340. As shown in FIG. 3, line 340 is provided to transport enable 255 which appears in FIG. 2A. Of course when the verification apparatus shown in FIG. 3 is used, the connection of line 240 to transport enable 255 which is shown in FIG. 2A would be disconnected. It may therefore be appreciated that receipt of a sequence of binary numbers on lines 177–180 which correspond to the same sequence of numbers located in memory 311 (the size of the sequence being determined by selector 326) a logical one will appear on line 340 and enable the recorder to respond to function control signals.

Next assume, that one of the sequence of binary numbers appearing on lines 177–180 is not equal to the corresponding number located in memory 311. When the number present on the output of memory 311 does not correspond bit for bit to the number on lines 177–180, one of the exclusive OR gates 331–334 will provide a logical one output as an input to OR gate 335 and thus a logical one will appear on line 336. Since a pulse will not appear on line 182 until the logic states on lines 177–180 are stable, the one on line 336 will be stable when the pulse appears on line 182 and thus on line 340 as a clock input to flip-flop 316.

When flip-flop 316 is clocked, the flip-flop will have a J equals zero, K equals one input state and flip-flop 316 will clear. This provides a logical zero on line 317 as an input to AND gate 318 and thus will maintain a logical zero on line 340. Note that once flip-flop 316 has cleared, it cannot be reset until a pulse appears on line 315 due to the recorder being seized again (which presumes that the dictate station providing the invalid signal has hung up) or when a keyboard error signal is entered. This is due to the fact that once flip-flop 316 clears, its only possible input states are two zeros, or J equals zero, K equals one, both of which will maintain the flip-flop in a cleared state. It may therefore be appreciated, that if any incorrect digit appears on lines 177–180, flip-flop 316 will be cleared and remain in a cleared state and prevent the transport of the recorder from responding to function control signals. It may also be seen that digital comparator 310 together with flip-flop 316 and AND gate 318 provide a means for preventing operation of the recorder until an entirely new and valid identification sequence is received.

The foregoing description of the preferred embodiment of the present invention has been by way of example and it will be understood that other embodiments of the present invention are possible within the scope of the claims below.

I claim:

1. In a recording system having a dictate station, a recorder for recording dictation, and operating means operable by said dictate station for the recording of dictation by said recorder; the improvement of
identification means associated with said dictate station for providing a selected sequence of identification signals;
memory means for providing at least one predetermined sequence of identification signals;
inhibiting means responsive to said predetermined sequence of identification signals and said selected sequence of identification signals for rendering said operating means inoperable by said dictate station when said selected sequence of identification signals does not have a predetermined relationship to said predetermined sequence of identification signals,
said inhibiting means comprising a comparator for comparing each individual signal of said selected sequence of identification signals with an individual signal of said predetermined sequence of identification signals and for providing an inhibiting output signal which renders said inhibiting means operative when an individual signal of said selected sequence of identification signals does not have a predetermined relationship to a particular individual signal of said predetermined sequence of identification signals;

latching means responsive to said inhibiting output signal from said comparator for maintaining said inhibiting output signal independently of said comparator; and     reset means associated with said latching means for resetting said latching means upon each occurrence of a predetermined error signal from said dictate station and upon each occurrence of a seizure condition.

2. Apparatus as recited in claim 1 wherein said selected sequence of identification signals and said predetermined sequence of identification signals comprise digital signals; and said comparator is a digital comparator.

3. Apparatus as recited in claim 1 wherein said inhibiting means is rendered inoperative in response to a correct number output, wherein said comparator is a first comparator, and further comprising     a second comparator responsive to said selected sequence of identification signals for providing a correct number output signal only in response to detection of a predetermined number of said identification signals in said selected sequence of identification signals.

* * * * *